United States Patent [19]
Parker

[11] 3,881,272
[45] May 6, 1975

[54] FISHING LURE EYE ASSEMBLY

[76] Inventor: Douglas W. Parker, 3015 Free Ferry, Fort Smith, Ark. 72901

[22] Filed: Oct. 1, 1973

[21] Appl. No.: 401,996

[52] U.S. Cl. ............................... 43/42.34; 46/165
[51] Int. Cl. ............................................ A01k 85/00
[58] Field of Search ............. 43/42.34; 46/165, 170

[56] References Cited
UNITED STATES PATENTS

| | | | |
|---|---|---|---|
| 1,569,993 | 1/1926 | MacLeod | 43/42.34 X |
| 2,195,315 | 3/1940 | Lustfield et al. | 46/165 X |
| 2,477,460 | 7/1949 | Larson | 46/165 |
| 2,991,588 | 7/1961 | Williams | 46/165 |

Primary Examiner—Louis G. Mancene
Assistant Examiner—Daniel J. Leach
Attorney, Agent, or Firm—Lowe, Kokjer, Kircher, Wharton & Bowman

[57] ABSTRACT

For artificial fishing lures, an eye assembly including a circular convex iris portion of molded, colored plastic having a central hole which receives a molded pupil structure, the eye assembly thereby being securely fixed to the lure body.

3 Claims, 8 Drawing Figures

FISHING LURE EYE ASSEMBLY

BACKGROUND AND SUMMARY OF THE INVENTION

This invention relates to fishing lures, and more particularly, to the eyes for artificial lures.

Fishing lures are preferably lifelike in order to be attractive to fish, and well defined, properly colored eyes having a high degree of color contrast add to a lure's lifelike quality. In conventional lures the eyes are painted directly on the lure surface or on a raised projection representing the eye structure.

In the conventional manufacturing process the body of the lure is first spray painted a particular color. After a drying period, paint is then applied to the iris portion for the eye. This may be hand or spray painted, but in either case considerable care must be taken to insure against the occurrence of smudges, ripples and density variations. After waiting for the iris to dry, paint is then applied to the pupil portion, usually by hand. The pupil is usually formed from a simple circular black dot which will be painted on the iris, but other geometries and color combinations may be employed. Again care must be taken to avoid paint smears and density variations in order to produce a well defined eye having a high degree of color contrast with the lure body.

The conventional manufacturing process is thus expensive and time consuming. Time is wasted during the frequent drying intervals, particularly when multicolored eyes are made. Labor costs inherent in the meticulous spray painting or hand painting operations amplify the expense of the process. Quality control rejection of finished lures having smeared or rippled eyes also drives manufacturing expenses upward.

Accordingly, it is an object of the subject invention to simplify and speed up the above described manufacturing process by providing a finishing lure eye assembly, the use of which will provide a superior substitute for the conventional eye painting process. The eye assembly consists of at least two separate and independent components which may be assembled quickly and conveniently in a single operation. Since colored plastic is preferably utilized to construct the components, the necessity for painting the eyes of the lure is avoided. An iris is formed from a circular ring having a convex outer side and either a flat or concave bottom. The iris ring is equipped with a central hole enabling a pupil structure to extend therethrough, thereby locating and retaining the iris ring on a mounting surface.

An additional object of the invention is to make the eyes of a fishing lure appear extremely lifelike by providing eyes which have well defined regions of extreme color contrast. In the prior art such an appearance is created by meticulous painting, which as mentioned, is expensive and time consuming. The subject invention utilizes plastic colored components which, when assembled, yield an eye structure having two concentric rings of extreme color contrast, the first occurring around the periphery of the iris, and the second occurring around the perimetry of the pupil. The subject invention thus enables a fishing lure to have a precisely defined eye structure with extreme color contrast, while at the same time allowing the manufacturer to avoid the delay and expense of the conventional painting process.

It is a further object of this invention to make the eyes of a fishing lure very resistant to deterioration. It is not unusual for a fishing lure to be cast into rocks, dragged across sand or gravel, and pulled through thick weed beds. A lure must be able to withstand collisions with tree trunks, tree limbs and other submerged obstacles. When stored and transported in a tackle box, the ordinary vibrations to which the lure is subjected will produce scratches. The lure should be resistant to fresh water, salt water, weather extremes and sunlight, and it should of course withstand the attack of fish. All of the foregoing conditions tend to deteriorate the lure (protruding eyes being particularly subject to wear) and thus detract from the lifelike appearance. In the subject invention, an eye assembly suitable for use in a fishing lure is constructed of molded colored plastic components which are highly resistant to friction, abrasion, and water deterioration. Likewise, paint flaking and paint fade are avoided altogether in the eyes and the lure retains a new appearance.

Other and further objects of this invention, together with the features of novelty appurtenant thereto, will appear in the course of the following description.

DESCRIPTION OF THE DRAWING

In the accompanying drawing which forms a part of the specification and is to be read in conjunction therewith, and in which like reference numerals are employed to indicate like parts in the various views:

FIGS. 1–4 illustrate a first embodiment of the invention. A fishing lure which includes the eye assembly of the invention has a body 10 with hooks 11 installed thereon.

Figure 1:
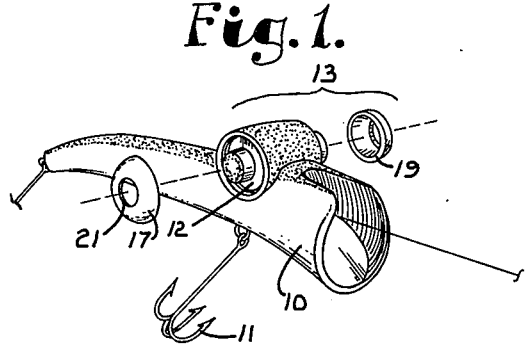
FIG. 1 is a perspective view of a fishing lure with an exploded eye assembly constructed in accordance with one preferred embodiment of the invention.

The lure is provided with a circular mounting surface 12 integrally molded with the lure body 10 and on which eye assembly 13 is attached. Mounting surface 12 has an indented circumferential groove 14 extending around its edge. Concentrically surrounding groove 14 is an adjacent annular raised rim 15. Rising outwardly from the center of the mounting surface 12 is a cylindrical projection 16 which is integral with the lure body 10. The outer surface of projection 16 provides the pupil of the eye assembly 13.

The iris portion of the eye assembly 13 comprises a circular ring 17 having a convex outer surface 18 and having an outside diameter substantially equal to the inside diameter of the rim 15. The iris ring 17 has a central hole 21 extending therethrough which has a diameter substantially equal to the diameter of cylindrical projection 16. When the iris ring 17 is installed the cylindrical projection 16 penetrates the iris hole 21 to maintain the iris ring 17 in concentric alignment therewith. The bottom edge 19 of the iris ring 17 mates within the circumferential groove 14 of the mounting surface 12, and peripheral contact with annular rim 15 further secures the iris ring 17 on the mounting surface 12.

Figure 2:
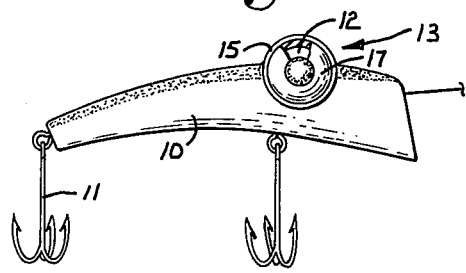
FIG. 2 is a side view of the fishing lure with a portion of the iris broken away.
Figure 3:
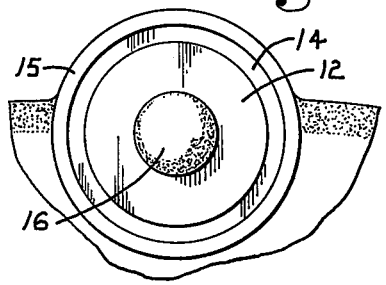
FIG. 3 is an enlarged fragmentary side view of the eye socket of the lure.
Figure 4:
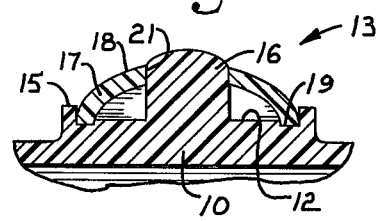
FIG. 4 is an enlarged sectional view of the eye assembly.

In the manufacturing process the lure shown in FIGS. 1 and 2 is assembled by gluing together two molded plastic halves, each having a suitable eye assembly mounting surface 12 pre-formed thereon. The lure body 10 may then be spray painted, but this may be unnecessary when the lure is built of suitably colored plastic. The iris ring 17 is then glued along its bottom edge 19 and fitted over projection 16 where it is securely held in place with its bottom 19 engageably meshing with groove 14. Raised annular rim 15 provides additional lateral support to the iris 17.

Since the iris ring 17 is made of molded plastic, a wide variety of colors are available for use. When, for example, the lure body 10 is painted black or molded of black plastic and the iris ring 17 is molded of yellow plastic, extreme color contrast results at the interface between the iris 17 and rim 15. Another line of extreme color contrast results at the interface of the iris 17 and the pupil projection 16. Thus, when the pupil of the eye is to be the same color as the body of the fishing lure, utilization of the subject invention in the manufacturing process dispenses with the need for separate eye painting operations. If, however, a lure is desired in which the pupil must be a different color than the lure body, utilization of this embodiment is nevertheless advantageous. In the latter case, the outer surface portion of the pupil structure 16 may be spray painted in a very quick operation before the iris 17 is installed so that paint smearing of the iris is completely eliminated.

Figure 5:
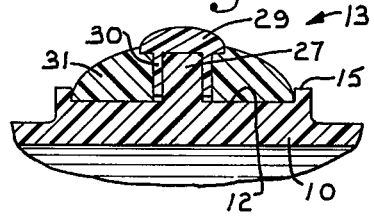
FIG. 5 is a sectional view of a second embodiment of the eye assembly.
Figure 6:
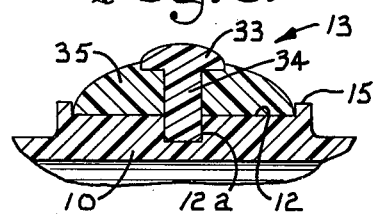
FIG. 6 is a sectional view of a third embodiment of the eye assembly.
Figure 7:
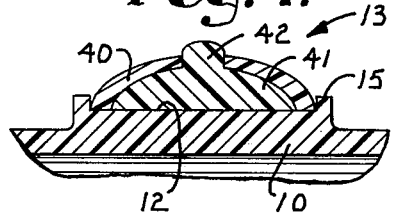
FIG. 7 is a sectional view of a fourth embodiment of the eye assembly.

Likewise, the alternate eye assembly embodiments shown in FIGS. 5–7 may be used where a pupil having a color different from the lure body is desired.

In FIG. 5 a central cylindrical mounting stub 27 which is integral with the lure body 10 projects upwardly from the mounting surface 12. Surrounding the mounting surface the circumferential raised rim 15 serves to position and retain iris 31. The pupil structure consists of a generally convex cap portion 29 which overlies a portion of the iris 31 and an integral tubular stem portion 30 extending from the underside of the cap 29. Iris 31 is a generally convex structure having a flat underside which smoothly mates on top of the mounting surface 12 when assembled. Extending through the iris 31 is a hole having a diameter substantially equal to the outside diameter of the stem 30 of the pupil.

The inner diameter of tubular stem 30 of the pupil is substantially equal to the diameter of stub 27 so that when assembled the pupil stem 30 matingly receives the mounting stub 27. The iris 31 is thus retained on the mounting surface 12 by the pupil cap 29. The upper portion of the iris hole may be suitably chamfered in order to matingly engage the pupil cap 29.

The latter embodiment is particularly desirable when the pupil is to be colored differently from the lure body since the use of a molded pupil of contrastingly colored plastic dispenses with the need for painting the pupil.

In the second embodiment, the manufacturing process consists of assembling the lure body by gluing together its two component halves, fitting the iris on the mounting surface, and inserting the pupil structure through the iris hole to engage the mounting stub. Glue is applied to the mounting stub 27 to adhesively affix the pupil structure. Glue may also be applied to the mounting surface on the back of the iris if further strength is desired. Alternatively, the pupil and iris may first be glued together and then attached as a unit to the mounting surface.

In FIG. 6, the pupil structure consists of a generally convex cap portion 33 which overlies a portion of the iris 35 and an integral cylindrical stem 34 which extends from the cap 33. The diameter of pupil stem 34 is substantially equal to the diameter of a central hole 12a in the mounting surface 12. Iris portion 35 is a convex structure having a flat underside which smoothly contacts the mounting surface 12. Extending through the iris 35 is a central hole having a diameter substantially equal to the diameter of the pupil stem 34 received therein. As in the previous embodiment, the upper portion of the iris hole is chamfered or otherwise profiled so that the pupil cap 33 may engagingly interfit therewith.

In utilizing the arrangement as shown in FIG. 6, the iris 35 may be adhesively affixed to the mounting surface where it will be retained by rim 15. The pupil stem 34 may then be adhesively inserted through the iris until it matingly engages the mounting surface and recess hole. Alternatively the iris and the pupil structure may be adhesively joined and installed as one unit on the mounting surface 12.

In FIG. 7 yet another embodiment of an eye assembly 13 is depicted. The iris 40 comprises a generally convex circular ring which has a concave underside and a central circular hole extending therethrough. The pupil consists of a generally convex base 41 having a flat underside which smoothly contacts the mounting surface 12. Integral with base 41 and extending from the top thereof is a substantially cylindrical nipple 42 which has a diameter substantially equal to the diameter of the iris hole.

Assembly in this embodiment is best accomplished by adhesively attaching the iris to the pupil prior to installation on the mounting surface 12. The engagement of pupil nipple 42 with the iris hole maintains the iris and pupil in concentric alignment. The resultant unit is then glued to the mounting surface 12 where circumferential rim 15 helps to center and retain the eye assembly.

The use of separately colored plastic components in the latter embodiment again avoids the necessity of a separate painting stage in the manufacturing process. Regions of extreme color contrast necessary in a well defined eye again result, depending on component coloration. At any rate, paint smears and textural irregularities are altogether avoided.

Figure 8:
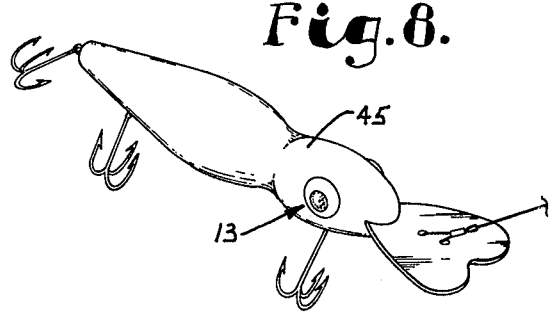
FIG. 8 is a perspective view of another fishing lure design for which the eye assembly may be utilized.

While the lure shown in FIGS. 1 and 2 is normally referred to as a surface lure used for floating on the surface of the water, any of the various embodiments of the eye assembly may likewise be installed on a wide range of other lures. Typical of such application, FIG. 8 shows a "deep diving" or bottom lure 45 on which an eye assembly 13 is installed in accordance with the principles herein taught.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention I claim:

1. An eye assembly for a fishing lure having a lure body with an eye mounting surface, said eye assembly comprising:
   a separate iris structure having a central circular hole extending therethrough, an exterior surface, and a lure body engaging rear surface for fixedly positioning the iris structure on the eye mounting surface of said lure body; and
   a pupil structure having at least a portion thereof associated with the exterior surface of said iris structure, said pupil structure comprising a generally convex cap portion having a generally cylindrical circular stem portion integral with said cap portion and extending therefrom, said cap portion having a diameter substantially greater than the diameter of said iris hole and said stem portion having a diameter substantially equal to said iris hole diameter,
   said mounting surface having a central circular hole therein, said hole having a diameter substantially equal to the diameter of said cylindrical stem portion of said pupil structure,
   said pupil stem portion extending through said hole in said iris and matingly interfitting with said hole in said mounting surface, the iris structure being retained on said mounting surface in concentric alignment with said pupil structure by said cap portion of said pupil structure.

2. An eye assembly for a fishing lure having a lure body with an eye mounting surface, said eye assembly comprising:
   a separate iris structure having a central circular hole extending therethrough, an exterior surface, and a lure body engaging rear surface for fixedly positioning the iris structure on the eye mounting surface of said lure body; and
   a pupil structure having at least a portion thereof associated with the exterior surface of said iris structure, said pupil structure comprising a generally convex cap portion having a circular tubular stem portion integral therewith and extending therefrom, the cap portion having a diameter substantially greater than the diameter of said iris hole, the tubular portion having an inner diameter and an outer diameter, said outer diameter of said tubular portion being substantially equal to said iris hole diameter,
   said mounting surface having a central circular cylindrical structure extending therefrom and integral therewith, said cylindrical segment having a diameter substantially equal to said inner diameter of said pupil structure stem portion,
   the pupil stem portion operable to penetrate said iris hole and to matingly engage said cylindrical structure extending from said mounting surface, the iris thereby being secured in concentric alignment with said pupil structure on said mounting surface by said cap portion of said pupil structure.

3. An eye assembly for a fishing lure having a lure body with an eye mounting surface, said eye assembly comprising:
   a separate iris structure having a central circular hole extending therethrough, a convex exterior surface, and a lure body engaging rear surface for fixedly securing the iris structure on the eye mounting surface of said lure body; and
   a pupil structure integrally formed with said lure body and having a cylindrical stem with a diameter substantially equal to the diameter of said hole through said iris structure;
   whereby said stem is adapted to engageably penetrate said hole in said iris to thereby fix said iris in concentric alignment with said pupil on the lure body.

* * * * *